(12) United States Patent
Pleasants

(10) Patent No.: US 10,335,671 B2
(45) Date of Patent: Jul. 2, 2019

(54) CHILD PROTECTIVE ENTERTAINMENT AND DINING ACCESSORY

(71) Applicant: Sarah Pleasants, South Chesterfield, VA (US)

(72) Inventor: Sarah Pleasants, South Chesterfield, VA (US)

(*) Notice: Subject to any disclaimer, the term of this patent is extended or adjusted under 35 U.S.C. 154(b) by 0 days.

(21) Appl. No.: 15/681,366

(22) Filed: Aug. 19, 2017

(65) Prior Publication Data

US 2019/0070488 A1 Mar. 7, 2019

(51) Int. Cl.
| | |
|---|---|
| *A63F 9/00* | (2006.01) |
| *A63H 33/00* | (2006.01) |
| *A47G 23/06* | (2006.01) |
| *A47B 13/14* | (2006.01) |
| *A47B 23/04* | (2006.01) |
| *A63F 7/00* | (2006.01) |
| *B60R 11/00* | (2006.01) |
| *A47G 23/03* | (2006.01) |

(52) U.S. Cl.
CPC .............. *A63F 9/001* (2013.01); *A47B 13/14* (2013.01); *A47B 23/04* (2013.01); *A47G 23/06* (2013.01); *A63H 33/006* (2013.01); *A47B 2200/0085* (2013.01); *A47G 23/0306* (2013.01); *A63F 7/00* (2013.01); *A63F 2250/604* (2013.01); *B60R 11/00* (2013.01)

(58) Field of Classification Search
CPC . A47B 2021/006; A47B 23/002; A47B 13/16; A47B 23/06; A47B 13/14; A47B 23/04; A63F 9/001; A63F 7/00; A47G 23/05; A63H 33/006

USPC .................. 108/90, 43, 27, 25, 26; 150/158; 248/345.1, 346.01, 346.04, 346.11; 428/99, 100, 227
See application file for complete search history.

(56) References Cited

U.S. PATENT DOCUMENTS

| | | | | |
|---|---|---|---|---|
| 2,028,128 A | * | 1/1936 | Braasch | A47D 1/008 297/150 |
| 2,301,673 A | * | 11/1942 | Allen | A63H 5/00 446/227 |
| 2,402,861 A | * | 6/1946 | Winnick | A63H 33/006 24/135 N |
| 3,181,483 A | * | 5/1965 | Devitt | A47B 23/00 108/159 |
| 5,427,292 A | * | 6/1995 | Rousch | A47B 23/001 108/25 |
| 5,520,119 A | * | 5/1996 | Eisenberg | A47B 23/002 108/43 |
| 6,116,162 A | * | 9/2000 | Santa Cruz | A47B 13/083 108/27 |
| 6,533,120 B1 | * | 3/2003 | Csengeri | A47G 19/06 206/565 |
| 8,388,403 B2 | * | 3/2013 | Seter | A47G 19/10 108/26 |
| 8,468,958 B2 | * | 6/2013 | Giabanis | A47G 19/10 108/26 |

(Continued)

*Primary Examiner* — Janet M Wilkens
(74) *Attorney, Agent, or Firm* — The Iwashko Law Firm, PLLC; Lev Ivan Gabriel Iwashko

(57) ABSTRACT

A child protective entertainment and dining accessory includes a base tray selectively attachable to and detachable from a dining table and configured to support at least one of food and drink for a child, and a rail elevated above and supported by the base tray onto which to secure one or more toys.

7 Claims, 1 Drawing Sheet

(56) References Cited

U.S. PATENT DOCUMENTS

| | | | | |
|---|---|---|---|---|
| 8,549,680 B1* | 10/2013 | Nichols | ................ | A47D 15/003 |
| | | | | 5/418 |
| 2003/0067193 A1* | 4/2003 | Asbach | ................. | A47D 1/002 |
| | | | | 297/16.1 |
| 2005/0076814 A1* | 4/2005 | Madden | ................ | A47D 1/008 |
| | | | | 108/44 |
| 2006/0180056 A1* | 8/2006 | Dorholt | ................ | A47B 13/086 |
| | | | | 108/90 |
| 2007/0207279 A1* | 9/2007 | Mesalic | ............ | A47G 23/0303 |
| | | | | 428/34.1 |
| 2007/0264459 A1* | 11/2007 | Trujillo | ............. | A47G 23/0303 |
| | | | | 428/43 |
| 2008/0187709 A1* | 8/2008 | Hester | ................ | A47G 23/0306 |
| | | | | 428/99 |
| 2008/0292836 A1* | 11/2008 | Mesalic | ............ | A47G 23/0303 |
| | | | | 428/99 |
| 2010/0003448 A1* | 1/2010 | Duce | ..................... | A47G 23/03 |
| | | | | 428/83 |
| 2013/0319884 A1* | 12/2013 | Gomez | ................. | F16M 13/06 |
| | | | | 206/216 |
| 2014/0345499 A1* | 11/2014 | Wilson | ................... | A47B 23/04 |
| | | | | 108/25 |
| 2016/0331152 A1* | 11/2016 | Wells | .................... | A47D 15/00 |

* cited by examiner

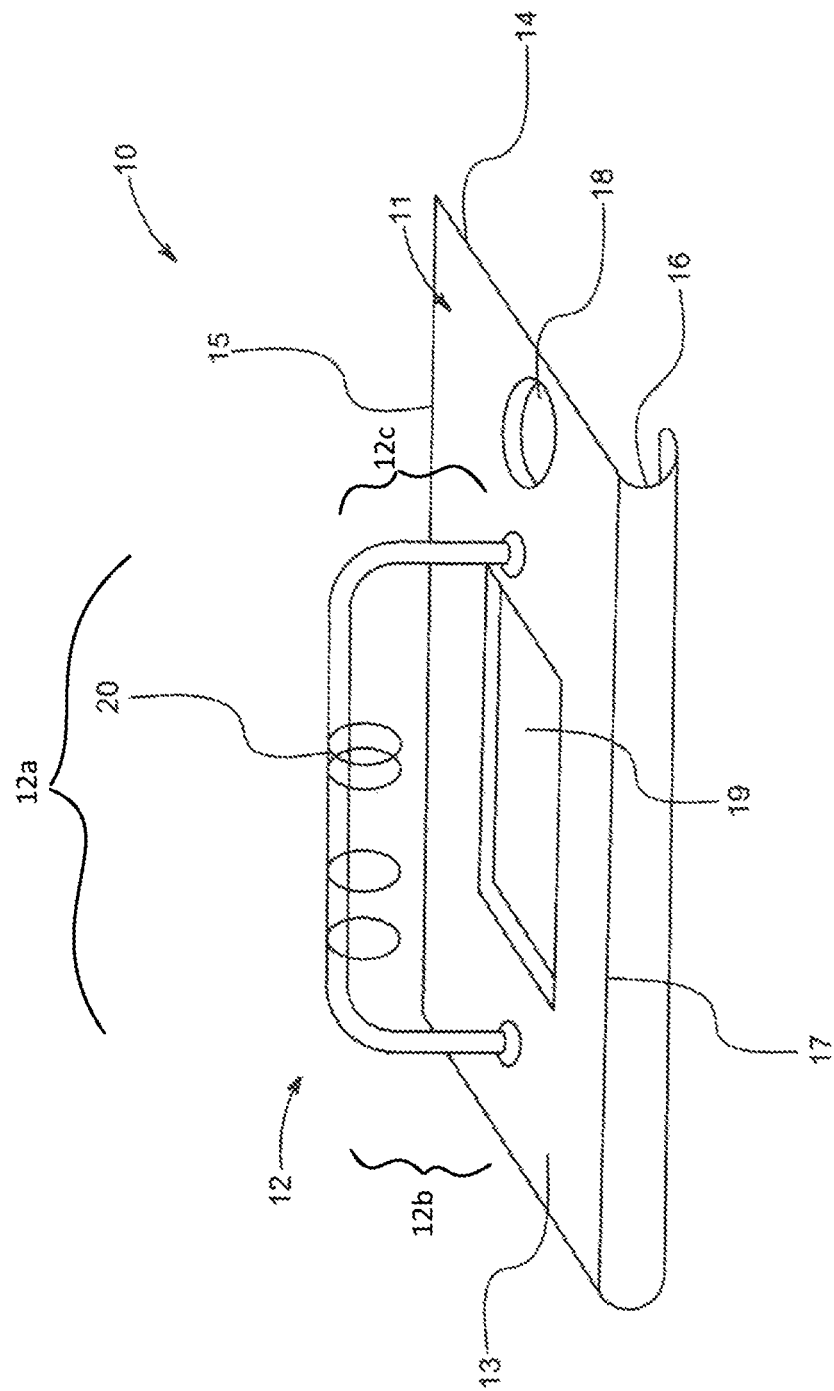

CHILD PROTECTIVE ENTERTAINMENT AND DINING ACCESSORY

BACKGROUND OF THE INVENTION

1. Field of the Invention

The present general inventive concept relates generally to devices that assist dining with a child and, more particularly, to a child protective entertainment and dining accessory.

2. Description of the Related Art

When dining with young children, and particularly when dining-out, parents have the problem of keeping their offspring distracted so that they themselves can relax and enjoy the meal. Often parents will attempt to solve this problem by bringing toys for a child to play with. But these toys oftentimes are dropped on the restaurant floor, where they may become contaminated with potentially harmful bacteria or pathogens. So, there remains a need for a practical device that may enable a young child to be entertained at mealtime, while the child is also protected from exposure to potentially harmful bacteria or pathogens. It would be desirable, particularly when dining-out, if such a practical device was protective at keeping a young child safely entertained and nourished during restaurant visits.

The present general inventive concept described herein provides for a child protective entertainment and dining accessory adapted to allow parents to bring with them and selectively attach and detach their own compact child protective accessory to a dining table, in particular, a typical restaurant table. The primary components making up Applicant's child protective accessory for use by caregivers, particularly parents, are a base tray selectively attachable to and detachable from a dining table and configured to support food and/or drink for a child, and an elevated rail supported by the tray onto which to secure one or more toys. The child protective accessory of the present general inventive concept provides the child with a hygienic and entertaining eating environment and enables the parents to have a more relaxed dining-out experience, with the child protective accessory being easily transportable in a travel bag. As a result, many of the drawbacks of parents dining-out with young children are overcome.

SUMMARY

The present general inventive concept provides a child protective entertainment and dining accessory.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a child protective entertainment and dining accessory, including a base tray selectively attachable to and detachable from a dining table and configured to support food and/or drink for a child, and a rail elevated above and supported by the tray onto which to secure one or more toys.

The base tray may have a peripheral edge and include a flexible edge extension extending along and from a portion of the peripheral edge of the base tray so as to enable the base tray to be selectively attachable to and detachable from the dining table.

The flexible edge extension of the base tray may have an arcuate-shaped configuration in cross-section. The flexible edge extension of the base tray may also have a lengthwise configuration corresponding to the configuration of an edge portion of the dining table to which the flexible edge extension is selectively attachable to and detachable from the dining table.

The child protective accessory may include a child cup holder on the base tray spaced from the rail. The child cup holder may be a compartment formed into the base tray.

The child protective accessory may further include a food compartment on the base tray. The food compartment may be a portion of the base tray recessed from a top surface of the base tray.

The child protective accessory may further include one or more rings provided on the elevated rail to secure one or more toys thereon. The elevated rail may have a U-shaped configuration.

BRIEF DESCRIPTION OF THE DRAWINGS

FIG. 1 is a front perspective view of a child protective entertainment and dining accessory built in accordance with the present general inventive concept.

DETAILED DESCRIPTION OF THE INVENTION

Referring now to the drawings and in particular to FIG. 1, a child protective entertainment and dining accessory 10 (hereinafter for the sake of brevity being referred to as the "child protective accessory 10") is illustrated having a base tray 11 and an elevated rail 12. The base tray 11, which may have a generally flat or planar configuration, has a top surface 13 and a bottom surface 14 surrounded by a peripheral edge 15. At least at the bottom surface 14 of the base tray 11, it may have a soft, padded configuration enabling attachment of the base tray 11 to a restaurant dining table (not shown) without scratching the same. The base tray 11 may be fabricated from a suitable plastic, rubber or metal material.

The base tray 11 may include an integral or separate, but easily attachable, flexible edge extension 16 extending along and from an edge portion 17 of the peripheral edge 15 of the base tray. The flexible edge extension 16 may extend below and be spaced from the bottom surface 14 of the base tray 11 and may have an arcuate-shaped configuration in cross-section and a lengthwise configuration corresponding to the configuration of an edge portion of the dining table so as to function the same as one or more adjustable clamps. For example, the flexible edge extension 16 may provide the child protective accessory 10 with a rounded clamp for use with circular or oval shaped restaurant tables that is easily assembled and attached to any restaurant table. If the restaurant table is square or rectangular in shape, then the flexible edge extension 16 may be provided as a detachable rounded section that can be quickly and easily removed.

The child protective accessory 10 may further include a child cup holder 18 and a food (or snack) compartment 19 on the base tray 11. The elevated rail 12 may include a lateral portion 12a, a first vertical portion 12b, and a second vertical portion 12c. The elevated rail 12 may have an inverted U-shaped configuration with one or more rings 20 provided on the elevated rail to secure one or more toys thereon. The lateral portion 12a may be in parallel with the base tray 11 to support the one or more rings 20, such that the lateral portion 12a may prevent the one or more rings 20 from contact with the food compartment 19. Moreover, a predetermined length of the lateral portion 12a may be substantially the same as a length of the food compartment 19. The first vertical portion 12b may be disposed on a first end of the lateral portion 12a. The second vertical portion 12c may be disposed on a second end of the lateral portion 12a. The first vertical portion 12b may extend a predetermined height above the base tray 11 to elevate at least a portion of the lateral portion 12a above the food compartment 19, such that the predetermined height of the first vertical portion 12b may be at least less than half of a length of the lateral portion 12a. Additionally, the second vertical portion 12c may extend a predetermined height above the base tray 11 to elevate at least a portion of the lateral portion 12a above the food compartment 19, such that the predetermined height of the second vertical portion 12c may bes equivalent to the predetermined height of the first vertical portion 12b. The child cup holder 18 is spaced from one end of the elevated rail 12 while the food compartment 19 is placed directly below the elevated rail such that the rail spans over the food compartment 19 to direct the attention of the child to focus on the food and toys at the same time.

The child cup holder 18 may be in the form of a compartment molded into the base tray 11 to hold a child's cup and the food compartment 19 may be in the form of a portion of the base tray recessed from the top surface 13 thereof. The elevated rail 12 may include a raised metal bar to which a variety of baby toys can be securely attached by the rings 20. The child can now play safely with its toys without the danger of those toys being contaminated by contact with the table surface or the floor. The child protective accessory 10 also prevents the child from making direct contact with the restaurant table, thus protecting it again from potentially harmful bacteria.

The child protective accessory 10 can easily appeal to caregivers as it is dishwasher safe and easily transportable, making it possible to be readily available at baby stores and/or online retailers. The child protective accessory 10 may be provided with a complimentary travel bag which can be clipped to a diaper bag, thus empowering caregivers to carry the compact device for on-the-go use.

To use it, the child protective accessory 10 may be carried to the restaurant in a travel bag that clips to a diaper bag. It easily is assembled and attached to any table. Once attached to the table toys can be clipped to the rail bar and the child can be pulled up to the table in a highchair to play. The elevated rail 12 may be provided to detach from the base tray 11 so that the child protective accessory 10 is easily collapsible so as to fit in the travel bag or carrying case.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A child protective entertainment and dining accessory, comprising:
    a base tray selectively attachable to and detachable from a dining table and configured to support at least one of food and drink for a child;
    a food compartment disposed on a portion of the base tray, such that the food compartment is recessed from a top surface of the base tray;
    a child cup holder disposed on a portion of the base tray to store a cup therein;
    a rail onto which to secure one or more toys such that the rail is supported by the base tray, the rail disposed above the food compartment, the rail comprising:
        a lateral portion in parallel with the base tray to support the one or more toys, such that the lateral portion has a length substantially the same as a length of the food compartment, such that the lateral portion prevents the one or more toys from contact with the food compartment,
        a first vertical portion perpendicularly disposed on a first end of the lateral portion to elevate at least a portion of the lateral portion above the base tray, such that the first vertical portion is removably connected to at least a portion of the top surface of the base tray, such that a height of the first vertical portion is at least less than half of a length of the lateral portion, such that the first vertical portion is disposed near at least a portion of a first edge of the food compartment between the food compartment and the child cup holder, and
        a second vertical portion perpendicularly disposed on a second end of the lateral portion to elevate at least a portion of the lateral portion above the base tray, such that the second vertical portion is removably connected to at least a portion of the top surface of the base tray, such that a height of the second vertical portion is equivalent to the height of the first vertical portion, such that the second vertical portion is disposed at a greater distance from a second edge of the food compartment with respect to the first vertical portion; and
    a flexible edge extension removably connected to at least a portion of an edge portion of the base tray to extend along and from an edge portion of a peripheral edge of the base tray.

2. The accessory of claim 1 wherein the base tray is selectively attachable to and detachable from the dining table.

3. The accessory of claim 2 wherein the flexible edge extension of the base tray has an arcuate-shaped configuration in cross-section.

4. The accessory of claim 2 wherein the flexible edge extension of the base tray has a lengthwise configuration corresponding to the configuration of an edge portion of the dining table to which the flexible edge extension is selectively attachable to and detachable from the dining table.

5. The accessory of claim 1, wherein the child cup holder is a compartment formed into the base tray.

6. The accessory of claim 1, further comprising:
    one or more rings provided on the elevated rail to secure one or more toys thereon.

7. The accessory of claim 1, wherein the elevated rail has an inverted U-shaped configuration.

* * * * *